United States Patent
Merz et al.

(10) Patent No.: US 8,062,467 B2
(45) Date of Patent: Nov. 22, 2011

(54) TWO-COMPONENT ADHESIVE FOR PRODUCING SEMI-FINISHED PRODUCTS AND COMPOSITE SANDWICH MATERIALS

(75) Inventors: Peter Merz, Wollerau (CH); Jurgen Finter, Zurich (CH)

(73) Assignee: Sika Technology, Baar (CH)

(*) Notice: Subject to any disclaimer, the term of this patent is extended or adjusted under 35 U.S.C. 154(b) by 865 days.

(21) Appl. No.: 10/590,654

(22) PCT Filed: Feb. 25, 2005

(86) PCT No.: PCT/EP2005/050801
§ 371 (c)(1),
(2), (4) Date: Oct. 5, 2007

(87) PCT Pub. No.: WO2005/080524
PCT Pub. Date: Sep. 1, 2005

(65) Prior Publication Data
US 2008/0093021 A1    Apr. 24, 2008

(30) Foreign Application Priority Data
Feb. 25, 2004   (EP) .................................. 04004189

(51) Int. Cl.
| C09J 163/00 | (2006.01) |
| C08G 59/22 | (2006.01) |
| C08G 59/14 | (2006.01) |
| C08F 283/00 | (2006.01) |
| C08F 283/10 | (2006.01) |
| C08L 75/00 | (2006.01) |

(52) U.S. Cl. .......... 156/330; 523/428; 525/528
(58) Field of Classification Search ........ 156/330; 523/428; 525/528
See application file for complete search history.

(56) References Cited

U.S. PATENT DOCUMENTS
| 4,578,424 A | 3/1986 | Goel |
| 4,728,737 A | 3/1988 | Goel |
| 4,962,138 A | 10/1990 | Kimball |
| 5,079,094 A | 1/1992 | Kimball |
| H2047 H * | 9/2002 | Harrison et al. ........... 428/297.4 |
| 2005/0159511 A1 | 7/2005 | Kramer |

FOREIGN PATENT DOCUMENTS
| DE | 199 19 783 A1 | 11/2000 |
| EP | 0 343 676 A2 | 11/2003 |
| EP | 1 359 202 A1 | 11/2003 |
| WO | WO 00/21747 | 4/2000 |

* cited by examiner

Primary Examiner — Philip Tucker
Assistant Examiner — Michael Orlando
(74) Attorney, Agent, or Firm — Oliff & Berridge, PLC (57) ABSTRACT

Two-component adhesives (K), which includes two components K1 and K2. Component K1 includes at least one epoxy resin A with more than one epoxy group per molecule on average; at least one epoxy adduct B with more than one epoxy group per molecule on average that is an epoxy adduct of type B1 and optionally combined with an epoxy adduct of type B2; at least one reaction product F between an epoxy adduct B and a compound C, which has at least two isocyanate groups, in addition to at least one curing agent D for epoxy resins, which is activated by increased temperature. The component K2 comprises a compound E, which includes at least two isocyanate groups.

38 Claims, 2 Drawing Sheets

TWO-COMPONENT ADHESIVE FOR PRODUCING SEMI-FINISHED PRODUCTS AND COMPOSITE SANDWICH MATERIALS

TECHNICAL FIELD

The present invention relates to the field of adhesives for fabrication of semifinished products and sandwich composites.

BACKGROUND

DE 199 19 783 A1 describes a manufacturing method for deep-drawn sheet metal composite parts with at least two layers. The adhesive used for this purpose in particular is an epoxy hot melt adhesive that is partially crosslinked by application of heat at a specific temperature and then formed after cooling down, and finally the crosslinking is completed by another application of heat. However, this method has the considerable disadvantage that it is very difficult to control the extent of partial crosslinking. We can also expect that during long storage times, such a partially crosslinked part will crosslink further so that after a long storage period, forming is no longer possible or else can be done only very poorly.

WO 00/21747 describes a method for fabrication of a baked enameled molded component. A hot melt epoxy adhesive is used for this purpose, which is crosslinked after deep drawing by application of heat. However, the described method leads to poor adhesion, which is why it is necessary to use a primer. Also the cooled hot melt adhesive cannot be plastically shaped and so during forming, in particular during deep drawing, leads to cracks in the molded part.

EP 0 343 676 A2 describes a reactive hot melt adhesive based on a polyurethane-epoxy adduct for use as a hem flanging adhesive in automotive assembly. But according to this method, folding is done immediately after sticking together the steel plates. However, the disclosed adhesive cannot be used for fabrication of a storable semifinished product, since the strength achieved (10 psi) is too low to prevent the adhesive from being squeezed out from between the plates by compressive forces during storage or during other forming methods.

SUMMARY

An aim of the present invention is therefore to provide an adhesive that on the one hand can develop sufficiently high strength even at room temperature to make sure that the semifinished product constructed from the adhesive and two flat substrates is storable and can be shaped without the adhesive being squeezed out from between the substrates, and on the other hand that such an adhesive or semifinished product can then later undergo again a curing step initiated by temperature, leading to high final strength as typically required by the automotive industry for auto bodies.

It was surprisingly discovered that this can be achieved by means of a two-component adhesive as described herein.

In particular, it has been shown that the embodiments according to the inventions are distinguished by a broad adhesive range, and in particular exhibit excellent adhesion to oiled sheet metal without pretreatment.

In addition, it could be shown that with an adhesive according to embodiments of the invention, extremely stable and lightweight semifinished products and sandwich composites can be produced. In addition, it could be shown that the sandwich composites produced by embodiment methods exhibit high impact strength and temperature stability.

Further advantageous embodiments of the invention follow from the following description.

DETAILED DESCRIPTION OF EMBODIMENTS

Two-component adhesives K, comprising two components K1 and K2. Component K1 includes at least one epoxy resin A with more than one epoxy group per molecule on the average; at least one epoxy adduct B with more than one epoxy group per molecule on the average, that is an epoxy adduct of type B1 and optionally combined with an epoxy adduct of type B2; at least one product F of reaction between an epoxy adduct B and a compound C, which has at least two isocyanate groups, as well as at least one curing agent D for epoxy resins that is activated by elevated temperature. The component K2 includes a compound E including at least two isocyanate groups.

The component K1 includes at least one epoxy resin A. The epoxy resin A has more than one epoxy group per molecule on the average. 2, 3, or 4 epoxy groups per molecule are preferred. Epoxy resin A is preferably a liquid resin, such as diglycidyl ether of bisphenol A (DGEBA), diglycidyl ether of bisphenol F, as well as diglycidyl ether of bisphenol A/F. (The designation "A/F" here refers to a mixture of acetone and formaldehyde, which is used as a starting material in its manufacture.) Because of the manufacturing process for these resins, clearly higher molecular weight components are also contained in the liquid resins. Such liquid resins are available, for example, as Araldite® GY 250, Araldite® PY 304, Araldite® GY 282 (Vantico), or D.E.R.® 331 (Dow).

The component K1 additionally includes at least one epoxy adduct B. The epoxy adduct B is an epoxy adduct of type B1 and optionally combined with an epoxy adduct of type B2.

The epoxy adduct B1 can be obtained by reaction of at least one dicarboxylic acid, preferably at least one dimeric fatty acid, such as at least one dimeric C4-C20 fatty acid (corresponding to a C8-C40 dicarboxylic acid) with at least one diglycidyl ether, preferably bisphenol A diglycidyl ether, bisphenol F diglycidyl ether, or bisphenol A/F diglycidyl ether. The epoxy adduct B1 has a flexibilizing character.

The epoxy adduct B2 can be obtained by reaction of at least one bis(aminophenyl)sulfone isomer or at least one aromatic alcohol with at least one diglycidyl ether. The aromatic alcohol is preferably selected from the group of 2,2-bis(4-hydroxyphenyl)propane (=bisphenol A), bis(4-hydroxyphenyl)methane (=bisphenol F), bis(4-hydroxyphenyl)sulfone, hydroquinone, resorcinol, pyrocatechol, naphthohydroquinone, naphthoresorcinol, dihydroxynaphthalene, dihydroxyanthraquinone, dihydroxybiphenyl, 3,3-bis(p-hydroxyphenyl)phthalide, 5,5-bis(4-hydroxyphenyl)hexahydro-4,7-methanoindane, as well as all isomers of the aforementioned compounds. Preferred bis(aminophenyl)sulfone isomers are bis(4-aminophenyl)sulfone and bis(3-aminophenyl)sulfone. The diglycidyl ether is may be bisphenol A diglycidyl ether, bisphenol F diglycidyl ether, or bisphenol A/F diglycidyl ether. Bis(4-hydroxyphenyl)sulfone is suitable as a particularly preferred aromatic alcohol. The epoxy adduct B2 is particularly preferred, which can be obtained by reaction of bis(aminophenyl)sulfone isomers with at least one diglycidyl ether. The epoxy adduct B2 has a rather rigid structure.

In a particularly preferred embodiment, epoxy adduct B is a combination of epoxy adduct B1 and epoxy adduct B2.

It has been shown that this particularly preferred combination of B1 and B2 has a higher glass transition temperature than the corresponding composition that only contains epoxy adduct B1.

Epoxy adduct B preferably has a molecular weight of 700-6000 g/mol, advantageously 900-4000 g/mol, preferably 1000-3300 g/mol. Here and in the following, by "molecular weight" we mean the average molecular weight $M_w$.

The epoxy adduct B is prepared in a way known to the person skilled in the art.

The total proportion of epoxy resin A is advantageously 12-50 wt. %, preferably 17-45 wt. %, based on the sum of the weights A+B.

Here and in the following, by "total proportion" in each case we mean the sum of all the components belonging to the given category. For example, if an adhesive contains 2 epoxy resins A, then the total proportion is the sum of these two epoxy resins.

Additionally, the total proportion of epoxy resin A and epoxy adduct B together is advantageously 10-60 wt. %, preferably 15-55 wt. %, based on the weight of the total adhesive K.

A catalyst known to the person skilled in the art such as, for example, triphenylphosphine can be used for synthesis of the epoxy adduct.

Component K1 additionally includes at least one product F of reaction between an epoxy adduct B and a compound C with at least two isocyanate groups. Compound C is preferably a polyisocyanate C1 or a polyurethane prepolymer C2 having isocyanate groups. This reaction product is prepared by using excess hydroxyl groups in epoxy adduct B relative to the isocyanate groups of compound C, i.e., the reaction product F no longer has detectable free isocyanate groups. In particular, this reaction product F is a product having the structure B' is structurally identical to B, except one hydroxyl groups is missing, and C' is structurally identical to C, except all the isocyanate groups are missing; and n+1 represents the number of isocyanate groups in C. This product has at least two free hydroxyl groups.

In this Application, by a "polyisocyanate" we mean a low molecular weight compound with more than two free isocyanate groups, which includes both monomers and their oligomers such as, for example, even biurets and isocyanurates. The following polyisocyanates that are very well known in polyurethane chemistry can be mentioned as examples for polyisocyanate C1:

2,4- and 2,6-toluylene diisocyanate (TDI) and any mixture of those isomers, 4,4'-diphenylmethane diisocyanate (MDI), the positional isomers of diphenylmethane diisocyanates, 1,3- and 1,4-phenylene diisocyanate, 2,3,5,6-tetramethyl-1,4-diisocyanatobenzene, 1,6-hexamethylene diisocyanate (HDI), 2-methylpentamethylene-1,5-diisocyanate, 2,2,4- and 2,4,4-trimethyl-1,6-hexamethylene diisocyanate (TMDI), 1,12-dodecamethylene diisocyanate, cyclohexane-1,3- and -1,4-diisocyanate and any mixtures of those isomers, 1-isocyanato-3,3,5-trimethyl-5-isocyanatomethylcyclohexane (=isophorone diisocyanate or IPDI), perhydro-2,4'- and -4,4'-diphenylmethane diisocyanate (HMDI), 1,4-diisocyanato-2,2,6-trimethylcyclohexane (TMCDI), m- and p-xylylene diisocyanate (XDI), 1,3- and 1,4-tetramethylxylylene diisocyanate (TMXDI), 1,3- and 1,4-bis(isocyanatomethyl)cyclohexane, as well as oligomers and polymers of the aforementioned isocyanates, as well as any mixtures of the aforementioned isocyanates. MDI, TDI, HDI, and IPDI are especially preferred.

The polyurethane prepolymer C2 having isocyanate groups is prepared from at least one polyisocyanate C1 and from at least one polyol.

For example, the following commercially available polyols or any mixtures thereof can be used as the polyols to make the polyurethane prepolymer:

Polyoxyalkylene polyols, also called polyether polyols, which are polymerization products of ethylene oxide, 1,2-propylene oxide, 1,2- or 2,3-butylene oxide, tetrahydrofuran or mixtures thereof, optionally polymerized using an initiator molecule with two or more active hydrogen atoms such as, for example, water, ammonia, or compounds with several OH or NH groups such as, for example, 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, and undecanediols, 1,3- and 1,4-cyclohexanedimethanol, bisphenol A, hydrogenated bisphenol A, 1,1,1-trimethylolethane, 1,1,1-trimethylolpropane, glycerol, aniline, as well as mixtures of the aforementioned compounds. Polyoxyalkylene polyols can be used that have a low degree of unsaturation (measured according to ASTM D-2849-69 and expressed in milliequivalents of unsaturation per gram polyol (meq/g)), synthesized for example using "double metal cyanide complex catalysts" (DMC catalysts), as well as polyoxyalkylene polyols with a higher degree of unsaturation, synthesized for example using anionic catalysts such as NaOH, KOH, or alkali metal alkoxides.

Polyoxyalkylene diols or polyoxyalkylene triols, such as polyoxypropylene diols or polyoxypropylene triols, are especially suitable.

Polyoxyalkylene diols or polyoxyalkylene triols are especially suitable that have a degree of unsaturation below 0.02 meq/g and a molecular weight in the range from 1000 to 30 000 g/mol, as well as polyoxypropylene diols and triols with a molecular weight from 400 to 8000 g/mol.

"EO-endcapped" (ethylene oxide-endcapped) polyoxypropylene diols or triols are also especially suitable. The latter are special polyoxypropylene polyoxyethylene polyols that can be obtained, for example, by alkoxylating pure polyoxypropylene polyols with ethylene oxide, after completion of polypropoxylation, and thus have primary hydroxyl groups. In this document, by "molecular weight" we always mean the average molecular weight $M_w$.

Polybutadienes with hydroxy functional groups.

Polyester polyols, synthesized for example from dihydric or trihydric alcohols such as, for example, 1,2-ethanediol, diethylene glycol, 1,2-propanediol, dipropylene glycol, 1,4-butanediol, 1,5-pentanediol, 1,6-hexanediol, neopentyl glycol, glycerol, 1,1,1-trimethylolpropane or mixtures of the aforementioned alcohols, reacted with organic dicarboxylic acids or their anhydrides or esters such as, for example, succinic acid, glutaric acid, adipic acid, suberic acid, sebacic acid, dodecanedicarboxylic acid, maleic acid, fumaric acid, phthalic acid, isophthalic acid, terephthalic acid, and hexahydrophthalic acid or mixtures of the aforementioned acids, as well as polyester polyols derived from lactones such as, for example, ε-caprolactone.

Polycarbonate polyols, as can be obtained, for example, by reaction of the above-indicated alcohols (used to synthesize the polyester polyols) with dialkyl carbonates, diaryl carbonates, or phosgene.

The indicated polyols have an average molecular weight from 250 to 30 000 g/mol and an average number of OH functional groups in the range from 1.6 to 3.

In addition to the indicated polyols, the following can be used to make the polyurethane prepolymer: low molecular weight dihydric or polyhydric alcohols such as, for example, 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, and undecanediols, 1,3- and 1,4-cyclohexanedimethanol, hydrogenated bisphenol A, dimeric fatty alcohols, 1,1,1-trimethylolethane, 1,1,1-trimethylolpropane, glycerol, pentaerythritol, sugar alcohols and other alcohols with a higher number of OH groups, low molecular weight alkoxylation products of the aforementioned dihydric and polyhydric alcohols as well as mixtures of the aforementioned alcohols.

Synthesis of the polyurethane prepolymer C2 having isocyanate groups can be carried out in such a way that the polyol and the polyisocyanate C1 are reacted by conventional procedures such as, for example, at temperatures from 50° C. to 100° C., optionally together with the use of suitable catalysts, where the polyisocyanate is measured out so that its isocyanate groups are present in stoichiometric excess relative to the hydroxyl groups of the polyol. The excess amount of polyisocyanate is selected so that in the resulting polyurethane prepolymer, after reaction of all the hydroxyl groups of the polyol, there is still a free isocyanate group content from 0.1 to 15 wt. %, preferably 0.5 to 5 wt. %, relative to the total polyurethane prepolymer. The polyurethane prepolymer can optionally be synthesized together with the use of solvents or plasticizers, where the solvents or plasticizers used do not contain any groups that react with isocyanates.

The molecular weight of the polyurethane prepolymer C2 having isocyanate groups is 400 to 10,000 g/mol, preferably 1000 to 5000 g/mol.

The component K1 additionally includes at least one curing agent D for epoxy resins which is activated at elevated temperature. Here the curing agent is preferably selected from the group of dicyanodiamide, guanamine, guanidine, aminoguanidine, and derivatives thereof. In addition, substituted ureas such as phenyl dimethylureas, preferably p-chlorophenyl-N,N-dimethylurea (monuron), 3-phenyl-1,1-dimethylurea (fenuron), or 3,4-dichlorophenyl-N,N-dimethylurea (diuron) are catalytically effective. Compounds in the class of imidazoles and amine complexes can also be used. Dicyanodiamide is particularly preferred.

The total proportion of curing agent D is advantageously 1-6 wt. %, preferably 2-4 wt. %, based on the weight of the total adhesive K.

Component K1 has no detectable amounts of free isocyanate groups.

Component K1 at room temperature is pasty to solid; typically component K1 can be first liquefied at temperatures above 60° C. in such a way that it can be processed with conventional application devices, for example, so it can be mixed.

Component K2 includes at least one compound E with at least two isocyanate groups. Here E can be a low molecular weight polymer compound.

The isocyanate group-containing compound E can be either a polyisocyanate C1 or a polyurethane prepolymer C2 having isocyanate groups, as have already been described for use in component K1, where the polyisocyanate C1 or polyurethane prepolymer C2 selected from the above-indicated selection for components K1 and K2 do not absolutely have to be the same.

In another preferred embodiment, the adhesive additionally contains at least one reactive diluent with epoxy groups. These reactive diluents include, for example:

Glycidyl ethers of monofunctional saturated or unsaturated, branched or unbranched, cyclic or open-chain C4-C30 alcohols, e.g. butyl glycidyl ether, hexyl glycidyl ether, 2-ethylhexyl glycidyl ether, allyl glycidyl ether, tetrahydrofurfuryl ether, and furfuryl glycidyl ether etc.

Glycidyl ethers of difunctional saturated or unsaturated, branched or unbranched, cyclic or open-chain C2-C30 alcohols, e.g. ethylene glycol diglycidyl ether, butanediol diglycidyl ether, hexanediol diglycidyl ether, octanediol diglycidyl ether, cyclohexane dimethanol diglycidyl ether, neopentyl glycol diglycidyl ether etc.

Glycidyl ethers of trifunctional or polyfunctional, saturated or unsaturated, branched or unbranched, cyclic or open-chain alcohols such as epoxidized castor oil, epoxidized trimethylolpropane, epoxidized pentaerythrol, or polyglycidyl ethers of aliphatic polyols such as sorbitol, etc.

Glycidyl ethers of phenol compounds and aniline compounds such as phenyl glycidyl ether, cresol glycidyl ether, p-tert-butyl phenyl glycidyl ether, nonylphenol glycidyl ether, glycidyl ether from cashew nutshell oil, cardanol glycidyl ether, for example available as Cardolite® NC-513 from Cardolite, N,N-diglycidyl aniline, etc.

Epoxidized tertiary amines such as N,N-diglycidyl cyclohexylamine etc.

Epoxidized monocarboxylic acids or dicarboxylic acids such as neodecanoic acid glycidyl ester, methacrylic acid glycidyl ester, benzoic acid glycidyl ester, phthalic acid diglycidyl ester, tetra- and hexahydrophthalic acid diglycidyl ester, diglycidyl esters of dimeric fatty acids, etc.

Epoxidized difunctional or trifunctional, low molecular weight to high molecular weight polyether polyols such as polyethylene glycol diglycidyl ether, polypropylene glycol diglycidyl ether, etc.

Hexanediol diglycidyl ether, polypropylene glycol diglycidyl ether, and polyethylene glycol diglycidyl ether as well as cardanol glycidyl ether are particularly preferred.

The total proportion of reactive diluent with epoxy groups is advantageously 1-7 wt. %, preferably 2-6 wt. %, based on the weight of the total adhesive K.

Components K1 and K2 can also each independently include at least one of the following constituents, where for the specific use in the respective component it must be ensured that this additional constituent does not react at room temperature or slightly elevated temperature with compounds already present in that component, since this would at best lead to crosslinking or to poorer storage stability:

filler;
thermoplastic polymer such as, for example, polystyrene, polyesters, polyphenylene oxide, phenoxy resins;
impact strength modifier;
organic thixotropic agent, preferably based on caster oil derivatives, urea derivatives, or acrylate derivatives;
catalyst for catalysis of the reaction between isocyanate groups and hydroxyl groups, such as, for example, organotin or organobismuth compounds, preferably dibutyltin dilaurate;

Catalyst for thermal activation of resin D, preferably the catalysts available commercially from SKW Troisdorf under the trade names Dyhard® UR 300 and Dyhard® UR 500;

Adhesion promoters, preferably alkoxysilanes, preferably alkoxysilane with functional groups selected from the group including epoxy, isocyanate, amine, and C—C double bonds;

Flameproofing agent;

Heat or UV radiation stabilizers.

An impact strength modifier is preferred as such a possible additional constituent. This can have functional groups or can have no functional groups. For example, it can be an impact strength modifier such as the one based on polybutadienes-acrylonitrile copolymers that is commercially available under the name Hycar® and their derivatives, such as the products of their reaction with diglycidyl ethers.

The impact strength modifier can also be a core/shell polymer. The core of the core/shell polymer preferably comprises a polymer with a glass transition temperature of −30° C. or lower, and the shell of the core/shell polymer preferably comprises a polymer with a glass transition temperature of 70° C. or higher. Examples of polymers that can be used as the core material are polybutadiene, polyacrylic acid ester, and polymethacrylic acid ester, as well as their copolymers or terpolymers with polystyrene, polyacrylonitrile, or polysulfide. The core material preferably comprises polybutadiene or polybutylacrylate. Examples of shell polymers are polystyrene, polyacrylonitrile, polyacrylate and polymethacrylate monomers, copolymers, or terpolymers or styrene/acrylonitrile/ glycidyl methacrylate terpolymers. Polymethylmethacrylate is preferably used as the polymer for the shells. The particle size of such core/shell polymers is appropriately 0.05-30 μm, preferably 0.05-15 μm. Core/shell polymers of particle size smaller than 3 μm are preferably used. Core/shell polymers are preferably used that contain a core made from polybutadiene or polybutadiene/polystyrene. This core material is preferably partially crosslinked. Other core materials are polyacrylates and polymethacrylates, such as polyacrylic acid ester and polymethacrylic acid ester as well as their copolymers and terpolymers.

The shells preferably comprise polymers based on methyl methacrylate, methacrylic acid cyclohexyl ester, acrylic acid butyl ester, styrene, or methacrylonitrile.

Commercially available core/shell polymer products are, for example, F-351 (Zeon Chemicals), Paraloid® and Acryloid® (Röhm and Haas), Blendex® (GE Specialty Chemicals), and the like.

The total proportion of the core/shell polymer is advantageously 3-20 wt. %, preferably 5-12 wt. %, based on the weight of the total adhesive K.

A filler is preferred as a possible additional constituent. Preferred fillers are on the one hand lightweight fillers such as hollow spheres made from glass, ceramic, metal, or organic polymers, such as "extendospheres" and microspheres. On the other hand, preferred fillers are inorganic fillers, preferably carbon blacks, chalk, metal powder, talc, silicic acid derivatives. Coated chalk and carbon black are also considered as particularly preferred.

Organic fillers such as polymers, such as polystyrenes, polyamides, and phenoxy resins, are considered as preferably suitable.

The total proportion of total filler is advantageously 5-30 wt. %, preferably 10-28 wt. %, based on the weight of the total adhesive K.

Components K1 and K2 are prepared according to conventional methods and placed in commercially available containers. Each step in which isocyanates are used typically is carried out with exclusion of moisture from the air, and preferably under an inert gas atmosphere. So it is also advantageous for all starting materials and additives used in this connection to be as dry as possible. It is also advantageous for components K1 and K2, in particular component K2, to be stored in containers that are as moisture-proof as possible. In this case, this is more particularly important for component K2.

Components K1 and K2 are mixed. The mix ratio depends inter alia on the use of fillers. If both components are unfilled or both are filled, it has been shown that a mix ratio of the components in a weight ratio of K1/K2=250/1 to 50/1, preferably 200/1 to 100/1, leads to particularly good properties. If only component K1 has fillers, it is found that a mix ratio of components in a weight ratio of K1/K2=100/1 to 5/1, preferably 50/1 to 10/1, is particularly advantageous.

Preferably, it is important for components K1 and K2 to be mixed in such a ratio that the OH/NCO ratio is $\geqq 2$, such as 2-50.

The two-component adhesive K is preferably used to fabricate a semifinished product H. Here at least component K1 is heated to a temperature between 130° C. and 60° C., preferably between 130° C. and 80° C., more preferably between 100° C. and 90° C. Then components K1 and K2 are mixed together. Mixing is carried out by conventional means such as static mixers, dynamic mixers, injection, or by metered addition using a feeder accessory. Possibly, for example to improve the quality of mixing, it can be advantageous to also heat component K2 before mixing to a temperature between 130° C. and 60° C., preferably between 130° C. and 80° C., more preferably between 100° C. and 90° C. The mixed adhesive K is applied to a flat substrate S1 after or during mixing. Here the substrate is excellently wetted by the mixed hot adhesive K. Then, typically, adhesive K is placed in contact with a flat substrate S2. This contact is usually made with application of pressure, such as by means of a press, to at least one of substrates S1 or S2 during or after the operation of bringing into contact with S2. Of course, it is also possible to apply the mixed adhesive K separately to each substrate S1 and S1 and to then join them together, so that in this case adhesive K meets adhesive K. In both cases, the adhesive K is placed between the substrates S1 and S2. The thickness of the adhesive layer K preferably is within about 0.5 mm.

The substrates can be quite different materials such as, for example, various plastics, glasses, ceramics, or metals or alloys. At least one of the substrates is preferably sheet metal, such as steel sheet or aluminum sheet. This substrate is preferably oiled steel sheet or oiled aluminum sheet. Oiled steel sheet has proven to be an especially suitable substrate. It has been shown that oiled metals can also be reliably bonded. This effect is explained by the fact that the oil, lying on the surface and protecting the metal from corrosion or facilitating its processing, is rapidly absorbed by the adhesive matrix and is thereby removed from the surface, so that excellent adhesion can develop.

One of the substrates S1 or S2 is preferably a plastic, preferably selected from the group including PVC, ABS, CFRP, polyamide and PMMA. In this case, the other substrate is preferably sheet metal, more preferably steel sheet.

In one preferred embodiment, both substrates S1 and S2 are sheet metals, preferably both made from the same metal. In the most preferred embodiment, substrates S1 and S2 are oiled steel sheet.

The flat substrates are preferably thin. In the case of sheet metal substrates, thicknesses between 0.5 mm and 0.1 mm, such as between 0.4 mm and 0.2 mm, are preferred. Thicker substrates often result in an undesirable thickness, while smaller thicknesses can lead to strength problems. These thin, flat substrates typically are used from a roll.

After application of adhesive K, or after the contacting step, adhesive K is cooled down. This can be accomplished by simply allowing the composite to cool down, or by means of active cooling. The viscosity increases due to cooling, which leads to setting of adhesive K. As a result the composite already has a certain basic strength, making it possible to move and work on the composite. By means of reaction of the compounds in components K1 and K2 that can react with each other, the strength of the adhesive bond rapidly increases. It typically takes hours to days for this strength to reach a constant value. However, this composite can be handled because of the already sufficient setting that occurs due to reaction. Such handling can involve, for example cutting, cutting to length, or coiling. This "semifinished product" H can be stored for longer periods, preferably for at least 3 months, preferably for at least 6 months. The semifinished product H is typically stored as coils or stacks of pieces cut to length. For use as semifinished products in the described way, the adhesive must have a strength of at least 0.5 MPa.

In one embodiment of the invention, for reinforcement either cut glass, metal, carbon, or thermoplastic fibers are added to adhesive K or else fabric, knitted fabric, or crossply of these fibers are additionally introduced between substrates S1 and S2 during fabrication of the semifinished product.

The semifinished product H is used to fabricate a sandwich composite S. Such semifinished products H or sandwich composites S can be used, for example, in the automotive industry. The semifinished product H in this case undergoes a forming process. The forming process is, for example, pressure forming such as upsetting and extrusion; tension/compression forming such as deep drawing and wire drawing; and tension forming such as stretch drawing and stretch straightening. The forming process can be carried out at room temperature. It is important that adhesive K in this stage be sufficiently crosslinked. The adhesive K should not be insufficiently crosslinked, so that it will not be squeezed out from between substrates S1 and S2 during storage of the semifinished product or during the forming process. The adhesive K should not be too extensively crosslinked so that it does not prevent proper deformation. During forming of semifinished product H to make formed part U, no cracks and no adhesion failures or escape of material at the edges occur.

As already mentioned, the thickness of the adhesive layer K between substrates S1 and S2 is preferably about 0.5 mm. This is especially the case if substrates S1 and S2 are steel sheet. Bulges formed during deep drawing, for example while making small cup-shaped indentations, are visually well-shaped, and the surface near the bulges is smooth. If the adhesive K layer thickness is significantly greater than 0.5 mm, then during deep drawing the semifinished product H more likely tends toward wavy, puckered, or wrinkled bulges. Such structures, however, are objectionable and so are undesirable, especially in cases where these formed regions are visible.

After the forming process for making semifinished product H into the formed part U, the formed part U is heated to a temperature between 130° C. and 230° C., preferably between 170° C. and 190° C., and is typically left at this temperature for 10 to 40 minutes. Between the forming process and heating, these parts are preferably dipped in a cathodic electrocoat dip tank. While heating in a convection oven, the cathodic electrocoating is baked and the adhesive K is further crosslinked at the same time.

That is, under these temperature conditions, the curing agent D for epoxy resins is activated and causes further crosslinking, which leads to further increase in strength. After cooling down to room temperature, we have the finished sandwich composite S. The latter has excellent final strength and is lightweight.

The sandwich composite S has considerably higher stiffness (as defined, for example, by 3-point bending strength) than a massive metal sheet of the same thickness and has excellent acoustic properties, as shown, for example, by very good damping of vibrations.

BRIEF DESCRIPTION OF THE DRAWINGS

Fabrication of a semifinished product H or a sandwich composite S is further illustrated schematically below with the help of the drawings. The same reference numbers are attached to the same elements in the different figures. Movements and forces are indicated by arrows.

Figure 1:
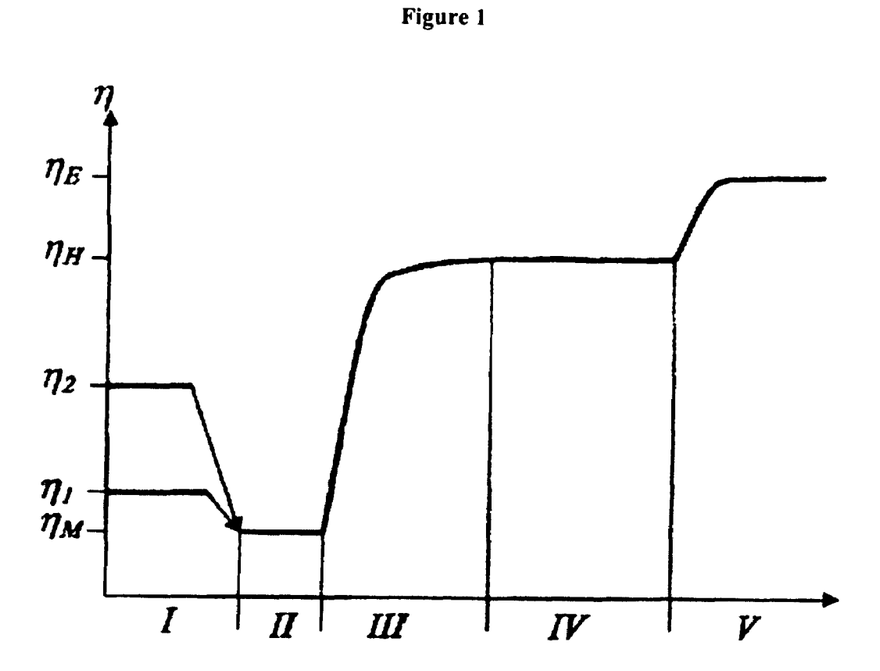
FIG. 1 shows a schematic representation of development of strength or viscosity of adhesive K as a function of time.

In FIG. 1, the time is divided into 5 periods. The durations of these periods are not drawn to scale.

The first time period I indicates the situation before mixing. At least component K1 is heated, and consequently its viscosity $\eta_1$ decreases. In this example, component K2 is not heated and has viscosity $\eta_2$.

The second time period II indicates the situation during mixing. The mixture of components K1 and K2 has viscosity $\eta_M$ immediately after mixing.

The third time period III indicates the stage of crosslinking and storage of semifinished product H. The strength or viscosity rises, due to cooling and crosslinking, from the mixture viscosity $\eta_M$ to a constant viscosity or strength $\eta_H$ of the semifinished product H.

The fourth time period IV indicates the forming process. The viscosity or strength remains essentially constant during the forming process.

The fifth time period V indicates the curing and construction of sandwich composite S. The viscosity or strength rises throughout the second crosslinking stage, and after cooling reaches the final strength $\eta_E$ of the sandwich composite S.

Figure 2:
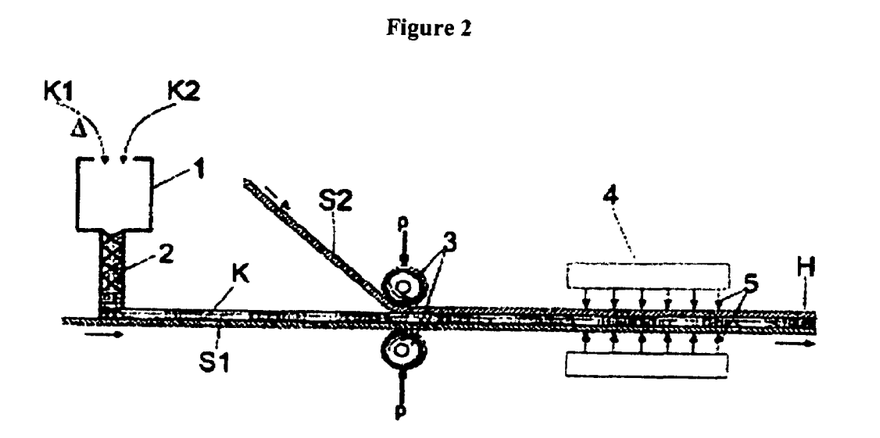
FIG. 2 schematically shows the fabrication of a semifinished product H.

FIG. 2 schematically shows the fabrication of a semifinished product H. This is shown on a schematic cross section by means of an example of industrial equipment for fabrication of semifinished products. At least component K1 is heated. The two components K1 and K2 of the two-component adhesive K are added to application device 1, where they are mixed using mixing elements. The mixed adhesive K then is applied at the outlet end to moving substrate S1. Further downstream, the adhesive K makes contact with a second substrate S2 and is pressed to the desired thickness by the rotating rollers 3. Further downstream, cooling station 4 is shown. In the example shown, cooling is carried out by blowing cool air 5. Not shown is the finishing further downstream, such as a cutting station and a stacking unit for preparing a stack of semifinished product H cut to length or a coiling station for semifinished product H as coils.

FIG. 3 schematically shows, in cross section, different times in fabrication of a formed part U and a sandwich composite S.

Figure 3A:
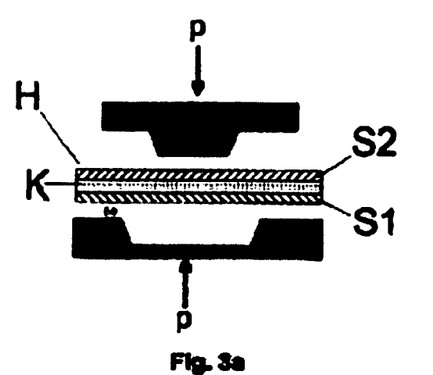
FIG. 3 schematically shows the fabrication and design of formed part U and sandwich composite S.

FIG. 3a here shows a semifinished product H which is placed in a forming apparatus. The forming apparatus has a die cavity 6 as well as a punch 7. The punch 7 is moved toward the die cavity by means of a press, such as a hydraulic press, whereby semifinished product H is pressed into the recess of die cavity 6 by the punch.

Figure 3B:
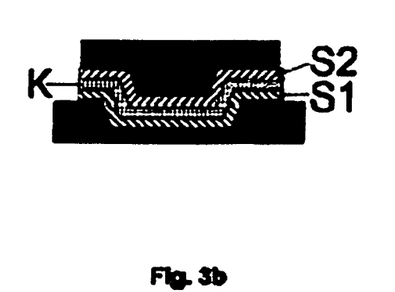

FIG. 3b shows the final stage of the pressing process. Formed part U was made from semifinished product H, which had conformed to the contours of die cavity 6 without wavy, puckered, or wrinkled bulges being formed and without the adhesive being squeezed out from between substrates S1 and S2.

Figure 3C:
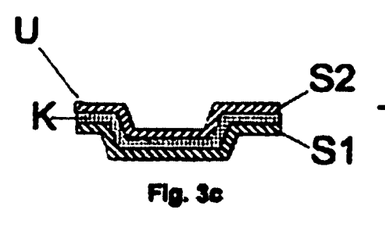

FIG. 3c shows formed part U as it comes out of the forming apparatus.

Figure 3D:
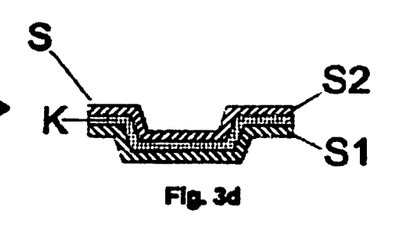

Finally, FIG. 3d shows the finished sandwich composite S, which is obtained from shaped part U after heating by means of a heater. Heating activates resin D, which leads to further crosslinking and achievement of the final properties.

LIST OF REFERENCE NUMBERS

K adhesive
K1 first component
K2 second component
S1 first substrate
S2 second substrate
H semifinished product
U formed part
S sandwich composite
1 application device
2 mixing element
3 roller
4 cooling station
5 cool air
6 die cavity
7 punch
Δ punch
p pressure

EXAMPLES

A few examples are given below which illustrate the invention further but do not limit the scope of the invention in any way. The raw materials used in the examples are as follows:

TABLE 1

| Raw materials used. | |
|---|---|
| Raw materials used | Supplier |
| Dimerized C18 fatty acid (Pripol ™ 1013) | Uniquema |
| Adipic acid | BASF |
| 2,2-Bis(4-hydroxyphenyl)propane | Fluka AG |
| Bis(4-hydroxyphenyl)sulfone | Fluka AG |
| Bisphenol A diglycidyl ether (= DGEBA) | Vantico |
| Polypropylene glycol diglycidyl ether (ED-506) | Asahi-Denka Kogyo |
| Polypropylene ether polyol ($M_w$ = 2000 g/mol) | Bayer |
| Desmodur ® CD | Bayer |
| 4,4'-Diphenylmethylene diisocyanate (= MDI) | Bayer |
| Triphenylphosphine | Fluka |
| CAB-O-SIL ® TS-720 | Cabot |
| Dibutyltin dilaurate (DBTDL) | Fluka |
| Dicyanodiamide (= Dicy) | SKW Troisdorf |
| Cardolite ® NC-513 | Cardanol |
| Ceramic hollow spheres/E-Spheres SL-125 | Osthoff-Petrasch |

General preparation for preparing epoxy adduct B and its mixture with A (=A/B premix):

A/B Premix PM1

Under vacuum and with stirring at 110° C., 123.9 g of a dimeric fatty acid, 1.1 g triphenylphosphine, and 57.3 g adipic acid were reacted for 5 hours with 658 g of liquid DGEBA epoxy resin, with epoxy content of 5.45 eq/kg, until a constant epoxy concentration of 2.85 eq/kg was achieved. After the end of the reaction, an additional 226.3 g of liquid DGEBA epoxy resin was added to the reaction mixture.

Then other mixtures PM2 to PM4 were prepared. For this purpose, the adipic acid was replaced by various aromatic alcohols in such a way that a theoretically identical epoxy content of 2.80-2.95 eq/kg was achieved in the binder:

A/B Premix PM2

Under vacuum and with stirring at 110° C., 123.9 g of a dimeric fatty acid, 1.1 g triphenylphosphine, and 95.0 g of 2,2-bis(4-hydroxyphenyl)propane (=bisphenol A) were reacted for 5 hours with 658 g of liquid DGEBA epoxy resin, with epoxy content of 5.45 eq/kg, until a constant epoxy concentration of 2.95 eq/kg was achieved. After the end of the reaction, an additional 226.3 g of liquid DGEBA epoxy resin was added to the reaction mixture.

A/B Premix PM3

Under vacuum and with stirring at 110° C., 123.9 g of a dimeric fatty acid, 28.3 g adipic acid, 1.1 g triphenylphosphine, and 47.3 g bis(4-hydroxyphenyl)sulfone were reacted for 5 hours with 658 g of liquid DGEBA epoxy resin, with epoxy content of 5.45 eq/kg, until a constant epoxy concentration of 2.85 eq/kg was achieved. After the end of the reaction, an additional 226.3 g of liquid DGEBA epoxy resin was added to the reaction mixture.

A/B Premix PM4

Under vacuum and with stirring at 110° C., 123.9 g of a dimeric fatty acid, 1.1 g triphenylphosphine, and 71.3 g bis(4-hydroxyphenyl)sulfone were reacted for 5 hours with 658 g of liquid DGEBA epoxy resin, with epoxy content of 5.45 eq/kg, until a constant epoxy concentration of 2.82 eq/kg was achieved. After the end of the reaction, an additional 226.3 g of liquid DGEBA epoxy resin was added to the reaction mixture.

Compound C1

A polyurethane prepolymer was prepared from MDI flakes (4,4-diphenylmethylene diisocyanate) and a polypropylene glycol with molecular weight of 2000 g/mol. The prepolymer had an NCO content of 3.7%.

Preparation of Adhesive K

Adhesive Formulations

Various adhesive compositions were prepared as specified in Table 2. In component K1, the A/B premix was uniformly mixed with prepolymer C1, dibutyltin dilaurate, Dicy, and Cabosil in a planetary mixer at a temperature of 95° C. under vacuum. Then ceramic hollow spheres were added and stirred at a stirring speed that was not too fast, in order to avoid breaking the hollow spheres. Then a cartridge was filled with K1 at a temperature between 85° C. and 95° C.

Components K1 and K2 were mixed well, in the ratio specified in Table 2, at a temperature between 85° C. and 95° C. in a Schramoid and added to a cartridge, and applied within 10 minutes after the end of mixing. For Ref. 2, no component K2 was added.

Application

Fabrication of a Semifinished Product

The adhesive, as specified in Table 2, was applied to 0.25 mm thick oiled steel sheet, covered with a second identical oiled steel sheet, and pressed to an adhesive thickness of 1 mm with a press equilibrated at about 100° C. After cooling, for adhesives K-1 to K-5 the adhesion of the sheet metal is good, so the composites can be easily handled.

TABLE 2

Adhesive formulations

| Designation | K-1 | K-2 | K-3 | K-4 | K-5 | Ref. 1 | Ref. 2 |
|---|---|---|---|---|---|---|---|
| 1. Component K1 | | | | | | | |
| A/B-PM1 [g] | 42.4 | — | — | — | — | 42.4 | 42.4 |
| A/B-PM2 [g] | — | 42.4 | — | — | — | — | — |
| A/B-PM3 [g] | — | — | 42.4 | — | — | — | — |
| A/B-PM4 [g] | — | — | — | 42.4 | 42.4 | — | — |
| C1 [g] | 26.7 | 26.7 | 26.7 | 26.7 | 22.2 | — | 26.7 |
| ED-506 (G) [g] | 2.0 | 2.0 | 2.0 | 2.0 | 2.0 | 2.0 | 2.0 |
| CAB-O-SIL ® [g] | 1.3 | 1.3 | 1.3 | 1.3 | 1.2 | 1.3 | 1.3 |
| Dicy (D) | 2.2 | 2.2 | 2.2 | 2.2 | 2.2 | 2.2 | 2.2 |
| DBTL [g] | 0.02 | 0.02 | 0.02 | 0.02 | 0.02 | — | 0.02 |
| E-Spheres SL-125 [g] | 24.9 | 24.9 | 24.9 | 24.9 | 23.1 | 24.9 | 24.9 |
| Total | 99.5 | 99.5 | 99.5 | 99.5 | 93.1 | 72.8 | 99.5 |
| 2. Component K2 | | | | | | | |
| Desmodur CD[g] | 100 | 100 | 100 | 100 | 26.7 | 100 | 0 |
| C1 (g) | | | | | 33.3 | | |
| CAB-O-SIL ® [g] | | | | | 1.3 | | |
| Cardolite ® NC-513 [g] | | | | | 8.0 | | |
| E-Spheres SL-125 [g] | | | | | 30.7 | | |
| Total | 100 | 100 | 100 | 100 | 100 | 100 | 0 |
| K2/K1 [w/w] | 0.54% | 0.54% | 0.54% | 0.54% | 14.3% | 0.54% | n.a. |

In addition, when pressure is applied again by means of a press, the adhesive is not squeezed out. For the comparison adhesives Ref. 1 and Ref. 2, however, the adhesive was squeezed out when pressure was applied.

Example K-5 Al corresponds to K-5, except that aluminum sheet of thickness 0.25 mm was used as the substrate instead of steel sheet.

As reference example Al/PP, 1 mm polypropylene was prepared as an interlayer between two aluminum sheets of thickness 0.25 mm.

Preparation of a Formed Part

To test the formability of the fabricated semifinished products, the deep-drawing properties were determined with the Erichsen cupping tester. A disk of diameter 64 mm was punched out from the semifinished product. A small cup-shaped indentation, a dome shape with diameter 40 mm and depth 20 mm, was deep-drawn. A ring-shaped lower holder prevented the adhesive compounds from peeling off the edge of the sheet metal.

All adhesives K-1 to K-5 could be easily formed, and there was no or only slight squeezing out of the adhesive. The reference adhesives Ref. 1 and Ref. 2 showed considerable squeezing out of the adhesive, so that at some spots essentially no more adhesive could be found between the pieces of sheet metal.

Comparing adhesives K-4 and K-5, it could be determined that K-5 exhibited better properties in deep drawing.

All adhesives K-1 to K-5 also showed identical behavior after 6 months, according to some stored semifinished stock material.

Preparation of a Sandwich Composite

All formed parts with adhesives K-1 to K-5 were cured in an oven for 25 minutes at 180° C. They all show very good curing, excellent adhesion, and good impact strength.

Since the mechanical properties have to be measured on flat substrates, we could not use the formed parts as the starting point but rather used the respective semifinished products H as follows:

The fabricated semifinished products were cured in an oven for 25 minutes at 180° C. After cooling, the mechanical properties of the sandwich composites were determined for K-5 and K-5 Al.

As the reference to be compared with the sandwich composites S, we used 1.5 mm thick aluminum sheet Al-1.5 as well as polypropylene-reinforced composite Al/PP.

Test Methods

T-peel strength (DIN 53282, ISO 11339)

This test method measures the force vertical to the adhesive surface. The dimensions of T-peel strength are N/mm (=average force [N] divided by the width of the test piece [mm]).

3-point bending strength (ISO 178)

The bending strength is the strength under a 3-point bending load with 20 cm span, where a 25 [missing units] wide test piece is used. The strength [N] is measured for bending of 2 mm, 5 mm, and 10 mm.

Results

From the results in Table 3, obviously the sandwich composites according to the invention are considerably stronger than massive aluminum sheet (Al-1.5) or Al-polypropylene composite (Al/PP), despite their much reduced weight.

It has been additionally shown that the sandwich composites have exceptionally good aging resistance and adhesion, as proven by the cataplasma test (70° C./100% relative air humidity).

TABLE 3

Mechanical properties of sandwich composites.

| Designation | K-5 | K-5Al | Al-1.5(Ref.) | Al/PP(Ref.) |
|---|---|---|---|---|
| T-peel strength (H) [N/mm] | 4.0 | | | |
| T-peel strength (S) [N/mm] | 4.4 | 2.37 | | |
| 3-point bending strength (S) [N] | | | | |
| 2 mm bend | 136 | 173 | 43 | 94 |
| 5 mm bend | 175 | 244 | 85 | 157 |
| 10 mm bend | 200 | 306 | 132 | 177 |
| after 7 days poultice | | | | |
| 2 mm bend | | 186 | | |
| 5 mm bend | | 263 | | |
| 10 mm bend | | 325 | | |

What is claimed is:

1. A two-component adhesive K, consisting of:
a component K1 and a component K2, wherein:
(a) component K1 comprises:
   at least one epoxy resin A having more than one epoxy group per molecule on average;
   at least one epoxy adduct B, wherein each epoxy adduct B has more than one epoxy group and more than one hydroxyl group per molecule on average;
   at least one product F of a reaction between an epoxy adduct B and a compound C with at least two isocyanate groups; and
   at least one curing agent D for epoxy resins, which is activated by elevated temperature; and
(b) component K2 comprises:
   at least one compound E with at least two isocyanate groups; wherein:
   epoxy adduct B is an epoxy adduct B1 obtained from at least one dicarboxylic acid and at least one diglycidyl ether, and is optionally combined with an epoxy adduct B2, obtained from at least one bis(aminophenyl)sulfone isomer or at least one aromatic alcohol and at least one diglycidyl ether,
   compound C is a polyurethane prepolymer C2 having isocyanate groups, which is synthesized from at least one of polyisocyanate C1 and from at least one polyol, the isocyanate groups of C1 are in stoichiometric excess relative to the hydroxyl groups of the polyol such that the resulting polyurethane prepolymer C2, after reaction of all the hydroxyl groups of the polyol, has a free isocyanate group content from 0.5 to 5 wt. % relative to the total polyurethane prepolymer C2, and
   the ratio of K1 and K2 is such that the OH/NCO ratio is >2:1.

2. The adhesive according to claim 1, wherein epoxy resin A is a liquid resin.

3. The adhesive according to claim 1, wherein the dicarboxylic acid is a dimeric fatty acid and the diglycidyl ether is selected from the group consisting of bisphenol A diglycidyl ether, bisphenol F diglycidyl ether, and bispheml A/F diglycidyl ether.

4. The adhesive according to claim 1, wherein:
epoxy adduct B2 is prepared from at least one aromatic alcohol and at least one diglycidyl ether,
the aromatic alcohol is selected from the group consisting of 2,2-bis(4-hydroxyphenyl)propane, bis(4-hydroxyphenyOmethane, bis(4-hydroxyphenyl)sulfone, hydroquinone, resorcinol, pyrocatechol, naphthohydroquinone, naphthoresorcinol, dihydroxynaphthalene, dihydroxyanthraquinone, dihydroxybiphenyl, 3,3-bis(p-hydroxyphenyl)phthalide, 5,5-bis(4-hydroxyphenyl) hexahydro-4,7-methanoindane, and isomers thereof; and
the diglycidyl ether is selected from the group consisting of bisphenol A diglycidyl ether, bisphenol F diglycidyl ether, and bisphenol A/F diglycidyl ether.

5. The adhesive according to claim 1, wherein epoxy adduct B has a molecular weight of 700-6000 g/mol.

6. The adhesive according to claim 1, wherein the reaction product F has the structure wherein B' is structurally identical to epoxy adduct B, except one hydroxyl groups is missing, and wherein C' is structurally identical to compound C, except all the isocyanate groups are missing, and wherein n+1 represents the number of isocyanate groups in compound C.

7. The adhesive according to claim 1, wherein curing agent D is a latent curing agent selected from the group consisting of dicyanodiamide, guanamine, guanidine, and aminoguanidine.

8. The adhesive according to claim 1, wherein compound E is a polyisocyanate or a polyurethane prepolymer having isocyanate groups, which is synthesized from at least one polyisocyanate and from at least one polyol.

9. The adhesive according to claim 1, wherein a total proportion of epoxy resin A and epoxy adduct B together is 10-60 wt. % based on a total weight of adhesive K.

10. The adhesive according to claim 1, further comprising at least one filler in a proportion of 5-30 wt. % based on a total weight of adhesive K.

11. The adhesive according to claim 1, further comprising at least one reactive diluent with epoxy groups.

12. A method for fabrication of a semifinished product H using the adhesive according to claim 1, comprising:
heating component K1 to a temperature between 130° C. and 60° C.;
mixing together components K1 and K2;
applying the mixed adhesive K to a flat substrate S1; and
contacting the adhesive K on substrate S1 with a flat substrate S2 so that the mixed adhesive K is placed between substrates S1 and S2.

13. The method according to claim 12, wherein the flat substrate S1 consists of the same material as the flat substrate S2.

14. The method according to claim 12, wherein at least one of substrates S1 or S2 is sheet metal.

15. The method according to claim 14, wherein the sheet metal has a thickness between 0.5 mm and 0.1 mm.

16. The method according to claim 12, wherein the semifinished product H is subsequently coiled into a roll and stored in the form of a coil; or
is cut to length and the semifinished product H, cut to length, is stored in the form of a stack.

17. The semifinished product H fabricated according to the method of claim 12.

18. A method for fabrication of a sandwich composite S, wherein the semifinished product H according to claim 17 undergoes a forming process and is heated to a temperature between 130° C. and 230° C.

19. The sandwich composite S fabricated according to claim 18.

20. An automotive assembly composite, comprising the sandwich composite S according to claim 19.

21. The adhesive according to claim 1, wherein epoxy resin A is a liquid resin selected from the group consisting of bisphenol A diglycidyl ether, bisphenol F diglycidyl ether, and bisphenol A/F diglycidyl ether.

22. The adhesive according to claim 3, wherein the dicarboxylic acid is a dimeric C4-C20 fatty acid.

23. The adhesive according to claim 1, wherein epoxy adduct B has a molecular weight of 900-4000 g/mol.

24. The adhesive according to claim 1, wherein epoxy adduct B has a molecular weight of 1000-3300 g/mol.

25. The adhesive according to claim 1, wherein the polyol is a polyoxyalkylene polyol.

26. The adhesive according to claim 1, wherein the polyol is a polyoxyalkylene diol.

27. The adhesive according to claim 8, wherein the polyol of compound E is a polyoxyalkylene polyol.

28. The adhesive according to claim 8, wherein the polyol of compound E is a polyoxyalkylene diol.

29. The adhesive according to claim 1, wherein a total proportion of epoxy resin A and epoxy adduct B together is 15-55 wt. % based on a total weight of adhesive K.

30. The adhesive according to claim 1, further comprising at least one filler in a proportion of 10-25 wt. % based on a total weight of adhesive K.

31. The method according to claim 12, wherein:
the step of contacting the adhesive K on substrate S1 with a flat substrate S2 further comprises applying pressure to at least one of substrates S1 or S2 during or after contact is made with substrate S2.

32. The method according to claim 14, wherein the sheet metal is steel sheet or aluminum sheet.

33. The method according to claim 32, wherein the sheet metal is oiled.

34. The method according to claim 14, wherein the sheet metal has a thickness between 0.4 mm and 0.2 mm.

35. The method according to claim 12, wherein components K1 and K2 are mixed in such a ratio that the OH/NCO ratio is 2:1 to 50:1.

36. A method for fabrication of a sandwich composite S, wherein the semifinished product H according to claim 17 undergoes a forming process and is heated to a temperature between 170° C. and 190° C.

37. The method according to claim 12, wherein component K1 is heated to a temperature between 130° C. and 80° C.

38. The method according to claim 12, wherein component K1 is heated to a temperature between 100° C. and 90° C.

* * * * *